(12) United States Patent
Okamoto et al.

(10) Patent No.: US 11,342,869 B2
(45) Date of Patent: May 24, 2022

(54) POLE DIRECTION DETECTION DEVICE AND POLE DIRECTION DETECTION METHOD

(71) Applicant: FANUC CORPORATION, Yamanashi (JP)

(72) Inventors: Takashi Okamoto, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/088,667

(22) Filed: Nov. 4, 2020

(65) Prior Publication Data

US 2021/0159824 A1 May 27, 2021

(30) Foreign Application Priority Data

Nov. 21, 2019 (JP) .............................. JP2019-210688

(51) Int. Cl.
*H02P 6/30* (2016.01)
*H02P 6/28* (2016.01)
*H02P 6/18* (2016.01)

(52) U.S. Cl.
CPC ................ *H02P 6/30* (2016.02); *H02P 6/183* (2013.01); *H02P 6/28* (2016.02); *H02P 2203/11* (2013.01)

(58) Field of Classification Search
CPC .... H02P 6/30; H02P 6/28; H02P 6/183; H02P 6/186; H02P 6/185; H02P 2203/01
See application file for complete search history.

(56) References Cited

U.S. PATENT DOCUMENTS

| 2014/0049202 A1* | 2/2014 | Fukumaru | ............... H02P 21/20 318/400.32 |
| 2014/0232306 A1* | 8/2014 | Yasui | ........................ H02P 6/00 318/400.02 |

FOREIGN PATENT DOCUMENTS

JP 2005-130582 A 5/2005

* cited by examiner

*Primary Examiner* — Bickey Dhakal
(74) *Attorney, Agent, or Firm* — Studebaker & Brackett PC

(57) ABSTRACT

A pole direction detection device for detecting a pole direction of a synchronous motor having saliency comprises a high-frequency voltage application unit that applies a high-frequency voltage to the motor; an excitation phase change unit that changes an excitation phase of the motor to an arbitrary phase; a driving current detection unit that detects a driving current value of the motor; a pole direction estimation unit that detects a pole direction based on the excitation phase and the driving current value; a measurement unit that measures an inductance value of the motor; and a control unit that changes a frequency of the high-frequency voltage to be applied by the high-frequency voltage application unit based on the inductance value measured by the measurement unit.

5 Claims, 8 Drawing Sheets

POLE DIRECTION DETECTION DEVICE AND POLE DIRECTION DETECTION METHOD

This application is based on and claims the benefit of priority from Japanese Patent Application 2019-210688, filed on 21 Nov. 2019, the content of which is incorporated herein by reference.

BACKGROUND OF THE INVENTION

Field of the Invention

The present invention relates to a pole direction detection device and a pole direction detection method.

Related Art

There has conventionally existed a method of detecting a pole while in a state where a motor is stopped, in a salient-pole synchronous motor. Japanese Unexamined Patent Application, Publication No. 2005-130582 discloses a technique in which when a high-frequency voltage whose amplitude is small is applied to a motor while an excitation phase of the motor is changed, a feedback current value is measured in each phase and a pole direction is estimated based on the magnitude of the feedback current value.

Patent Document 1: Japanese Unexamined Patent Application, Publication No. 2005-130582

SUMMARY OF THE INVENTION

However, in the case where the order of the inductance value is large, the obtained feedback current value becomes small, resulting in that the estimation of the pole direction is likely to be affected by noise. This is likely to cause errors in detection results of the pole direction, resulting in that a variation in the detection results is large even when the pole direction is estimated a plurality of times.

One embodiment of the present invention provides a pole direction detection device (for example, a pole direction detection device 1 described later) for detecting a pole direction of a synchronous motor having saliency (for example, a motor 10 described later), the pole direction detection device comprising: a high-frequency voltage application unit (for example, a high-frequency voltage application unit 2 described later) that applies a high-frequency voltage to the motor; an excitation phase change unit (for example, an excitation phase change unit 3 described later) that changes an excitation phase of the motor to an arbitrary phase; a driving current detection unit (for example, a driving current detection unit 4 described later) that detects a driving current value of the motor; a pole direction estimation unit (for example, a pole direction estimation unit 5 described later) that executes pole direction estimation based on the excitation phase and the driving current value under application of the high-frequency voltage; a measurement unit (for example, a measurement unit 6 described later) that measures an inductance value of the motor; and a control unit (for example, a control unit 7 described later) that changes a frequency of the high-frequency voltage to be applied by the high-frequency voltage application unit based on the inductance value measured by the measurement unit.

One embodiment of the present invention provides a pole direction detection method of detecting a pole direction of a synchronous motor having saliency, the pole direction detection method comprising: a high-frequency voltage application step of applying a high-frequency voltage to the motor; an excitation phase change step of changing an excitation phase of the motor to an arbitrary phase; a driving current detection step of detecting a driving current value of the motor; a pole direction estimation step of executing pole direction estimation based on the excitation phase and the driving current value under application of the high-frequency voltage; a measurement step of measuring an inductance value of the motor; and a voltage-to-be-applied frequency change step of changing a frequency of the high-frequency voltage to be applied in the high-frequency voltage application step based on the inductance value measured in the measurement step.

The present invention can provide a pole direction detection device that enables pole detection of a synchronous motor having saliency with high accuracy.

DETAILED DESCRIPTION OF THE INVENTION

Hereinafter, an embodiment of the present invention will be described, but the present invention is not limited thereto.

Figure 1:
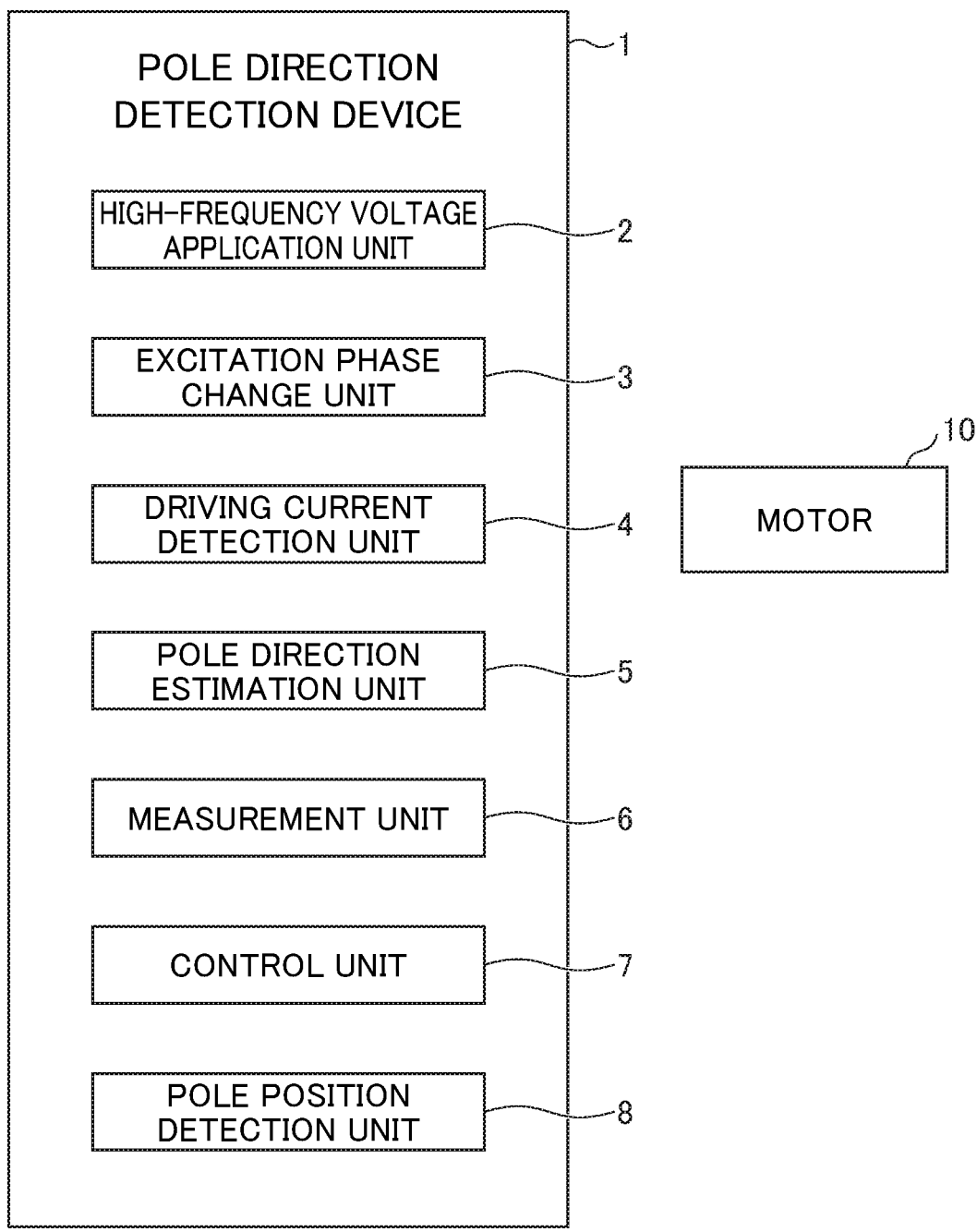
FIG. 1 is a block diagram illustrating a configuration of a pole direction detection device according to one embodiment of the present invention.

FIG. 1 is a block diagram illustrating a configuration of a pole direction detection device according to one embodiment of the present invention. A pole direction detection device 1 of the present embodiment includes a high-frequency voltage application unit 2, an excitation phase change unit 3, a driving current detection unit 4, a pole direction estimation unit 5, a measurement unit 6, a control unit 7, and a pole position detection unit 8. The pole direction detection device 1 can detect a pole direction of a synchronous motor 10 having saliency with high accuracy.

Figure 2A:
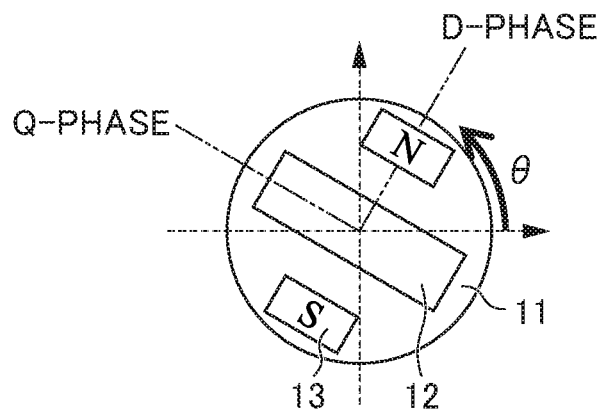
FIG. 2A is an explanatory diagram for explaining a pole direction in an embedded magnet type motor.
Figure 2B:
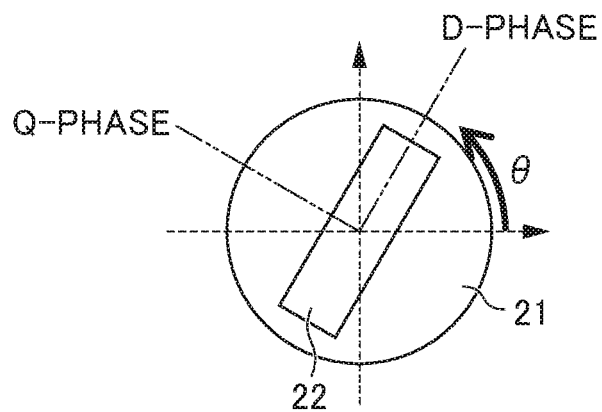
FIG. 2B is an explanatory diagram for explaining a pole direction in a reluctance type motor.

The synchronous motor 10 serving as a detection target of the pole direction may be any synchronous motor having saliency. The synchronous motor 10 may be, for example, an embedded magnet type motor 10 in which an iron core 12 is disposed on a rotor 11 and permanent magnets 13 are embedded in the rotor 11 as illustrated in FIG. 2A, or a reluctance type motor 20 in which only an iron core 22 is disposed on a rotor 21 as illustrated in FIG. 2B. The motor 10, 20 has an inductance around a rotary axis of the rotor 11, 21 that varies depending on the iron core 12, 22 disposed on the rotor 11, 21 or the asymmetry of the permanent magnets 13. The following mainly describes an embodiment directed to the embedded magnet type motor 10 serving as a detection target, and also describes the case where the reluctance type motor 20 serves as a detection target, as appropriate.

The high-frequency voltage application unit 2 can apply a high-frequency voltage to the rotor 11 of the motor 10. The excitation phase change unit 3 changes an excitation phase of the motor 10 to which the high-frequency voltage application unit 2 applies the high-frequency voltage. The driving current detection unit 4 detects a driving current flowing in the motor 10 by application of the high-frequency voltage. The pole direction estimation unit 5 estimates a pole direction of the motor 10 based on the excitation phase of the motor 10, and a value of the driving current detected by the driving current detection unit 4 under the application of the high-frequency voltage.

The value of the driving current flowing in the motor 10 by application of the high-frequency voltage changes depending on the excitation phase of the motor 10 when the high-frequency voltage is applied. The excitation phase θ is changed in a range of 0≤θ≤180° by the excitation phase change unit 3, and the value of the driving current is detected by the driving current detection unit 4, whereby the relationship of a driving current value i with respect to the excitation phase θ at the voltage frequency at that time can be examined. The excitation phase of the motor 10 can be changed by, for example, rotating the rotor 11.

Here, the pole direction detected by the pole direction detection device 1 of the present embodiment will be described. As illustrated in FIG. 2A, a rotation angle of the rotor 11 is assumed as θ. When an S pole of a magnet is directed toward the rotor 11 from the outside, the rotor 11 rotates and faces the S pole. An angle position θ of the rotor 11 at this time is referred to as a pole position (D phase) of the rotor 11, and a direction of a straight line (D axis) connecting a rotation center and the pole position of the rotor 11 is a pole direction. A Q axis is orthogonal to the D axis in a rotation plane of the rotor 11. For example, in the rotor 11 of the embedded magnet type motor 10 illustrated in FIG. 2A, a direction extending along N and S poles of the embedded permanent magnets 13 is a pole direction. In addition, in the rotor 21 of the reluctance type motor 20 illustrated in FIG. 2B, a long side direction of the iron core 12 drawn schematically in a rectangular shape is a pole direction.

As described above, in the synchronous motor having saliency, a D-phase inductance Ld and a Q-phase inductance Lq are different from each other due to the asymmetry of the rotor structure. The inductance is an index representing the permeability of magnetic flux. In the rotor 11 of the embedded magnet type motor 10, Ld<Lq is established. In the rotor 21 of the reluctance type motor 20, Lq<Ld is established.

The pole direction detection device 1 of the present embodiment detects a pole direction based on amplitude of a current time integral value (di/dt) obtained by integrating the current value i with respect to time t. The current time integral value can be represented by the following equation (1), and periodically changes according to a change in excitation phase θ.

Figure 3A:
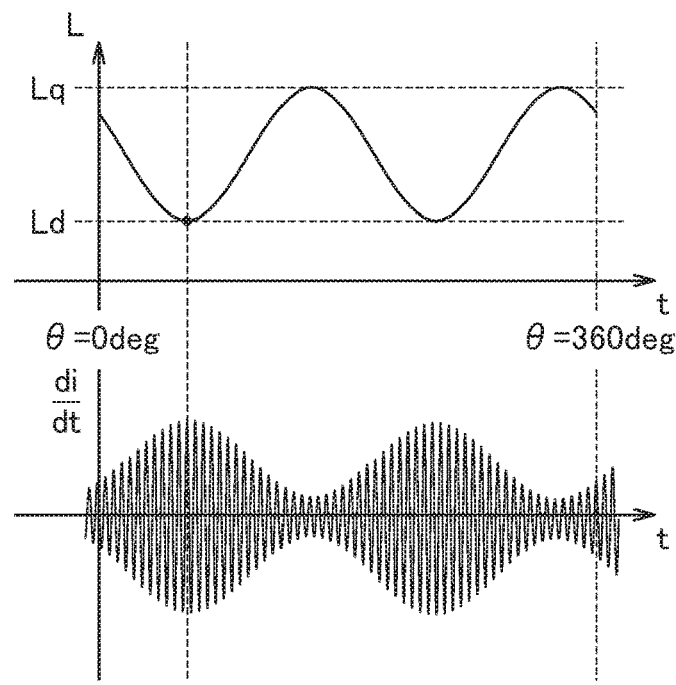
FIG. 3A is a graph showing a relationship between an inductance and a current time integral value in the embedded magnet type motor.
Figure 3B:
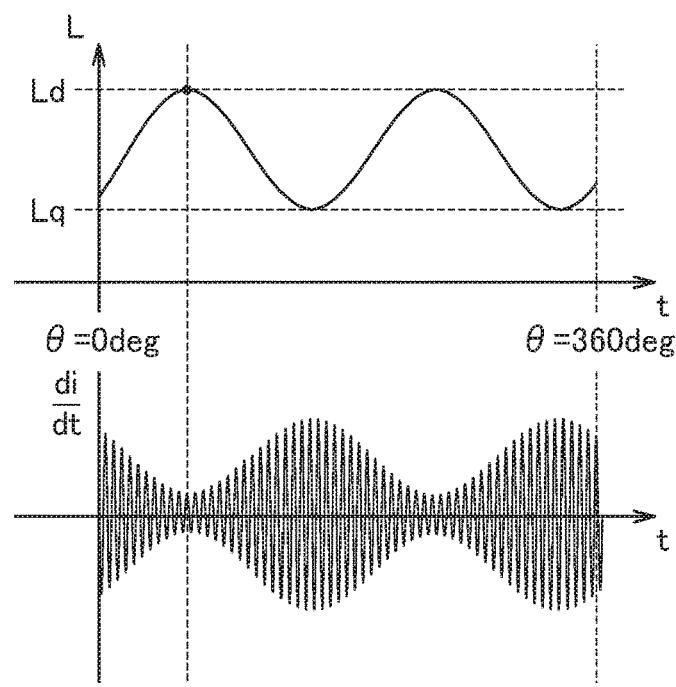
FIG. 3B is a graph showing a relationship between an inductance and a current time integral value in the reluctance type motor.

[Expression 1]

$$\frac{di}{dt} = \frac{L_0 - L_2 \cos 2(\theta(t) - \theta_p)}{L_d \cdot L_q} V \sin \gamma t \qquad (1)$$

Where $L_0 = (L_d + L_q)/2$ $L_2 = (L_d - L_q)/2$

θ(t): phase of applied voltage at time t
$\theta_p$: pole position
V sin γt: high-frequency voltage As shown in FIGS. 3A and 3B, the magnitude of the inductance is inversely correlated with the magnitude of the amplitude of the current time integral value. That is, for example, in the case of the embedded magnet type motor 10, the inductance takes a local maximum value Lq when the amplitude of the current time integral value takes a local minimum value. In addition, the inductance takes a local minimum value Ld when the amplitude of the current time integral value takes a local maximum value (FIG. 3A). In the case of the reluctance type motor 20, the inductance takes a local maximum value Ld when the amplitude of the current time integral value takes a local minimum value. In addition, the inductance takes a local minimum value Lq when the amplitude of the current time integral value takes a local maximum value (FIG. 3B).

Accordingly, the pole direction detection device 1 can detect the local minimum value or the local maximum value of the amplitude of the current time integral value while changing the excitation phase θ in a range of 0°≤θ≤360° with the time t, and estimate a pole direction by outputting the excitation phase at that time. Specifically, in the case of the above-described embedded magnet type motor 10, the inductance takes Ld when the amplitude of the current time integral value takes the local maximum value. When the excitation phase at that time is $\theta_1$, $\theta_1 + n \times 180°$ (0°≤$\theta_1$≤180°, n is an integer) is a pole direction. In the case of the reluctance type motor 20, the inductance takes Ld when the amplitude of the current time integral value takes the local minimum value. When the excitation phase at that time is $\theta_2$, $\theta_2 + n \times 180°$ (0°≤$\theta_2$≤180°, n is an integer) is a pole direction.

Figure 4:
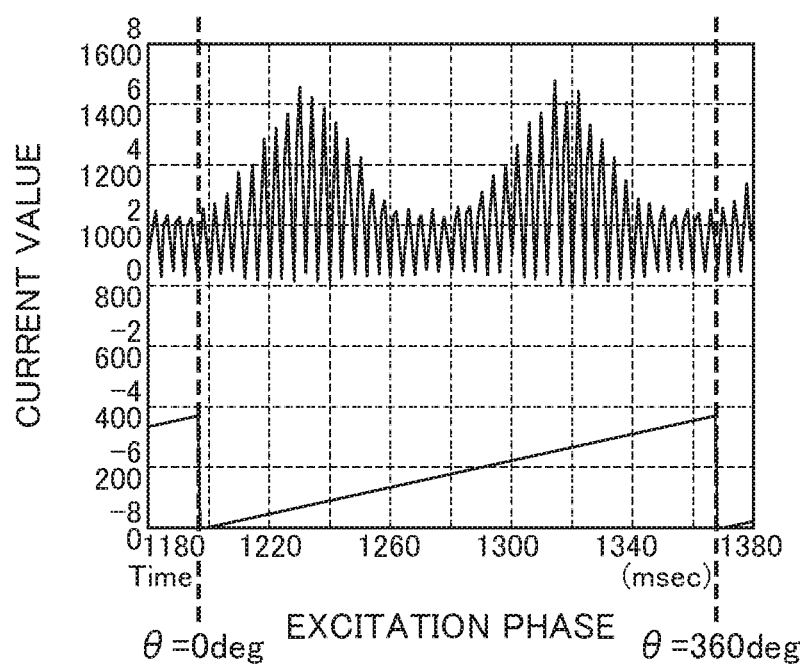
FIG. 4 is a graph showing the current time integral value with respect to a change in excitation phase.

FIG. 4 is a graph showing a relationship between the driving current value and the excitation phase. The pole direction detection device 1 monitors changes in current value and excitation phase θ over time under application of a certain high-frequency voltage, and estimate a pole direction based on the excitation phase θ when the amplitude of the current time integral value takes the local minimum value.

The current time integral value periodically changes according to an increase in θ, and each of the local maximum value and the local minimum value of the current time integral value appears two times per cycle. Accordingly, by estimating and averaging of values of excitation phases θ corresponding to the local maximum value and the local minimum value appearing a plurality of times, respectively, the pole direction detection device 1 can estimate the pole direction with higher accuracy. Therefore, it is preferable to estimate the pole direction while changing the excitation phase over one or more cycles.

The pole direction detection device 1 may detect the local maximum value or the local minimum value of the amplitude of the current time integral value to estimate the pole direction, but it is preferable to estimate the pole direction by particularly detecting the local maximum value. This is because the amplitude of the current time integral value changes around the local maximum value more rapidly than around the local minimum value, and hence the estimation of the pole direction is less likely to be affected by the noise, thereby improving the detection accuracy. In the case of the embedded magnet motor 10 with Ld<Lq, the excitation phase itself corresponding to the detected local maximum value is estimated as the pole direction. In the case of the reluctance type motor 20 with Lq<Ld, a phase shifted by 90° from the excitation phase corresponding to the detected local maximum value is estimated as the pole direction. In this way, for example, the pole direction detection device 1 detects the local maximum value appearing 2S times while rotating the rotor 11 "S" cycles, and estimates the pole direction.

Figure 5A:
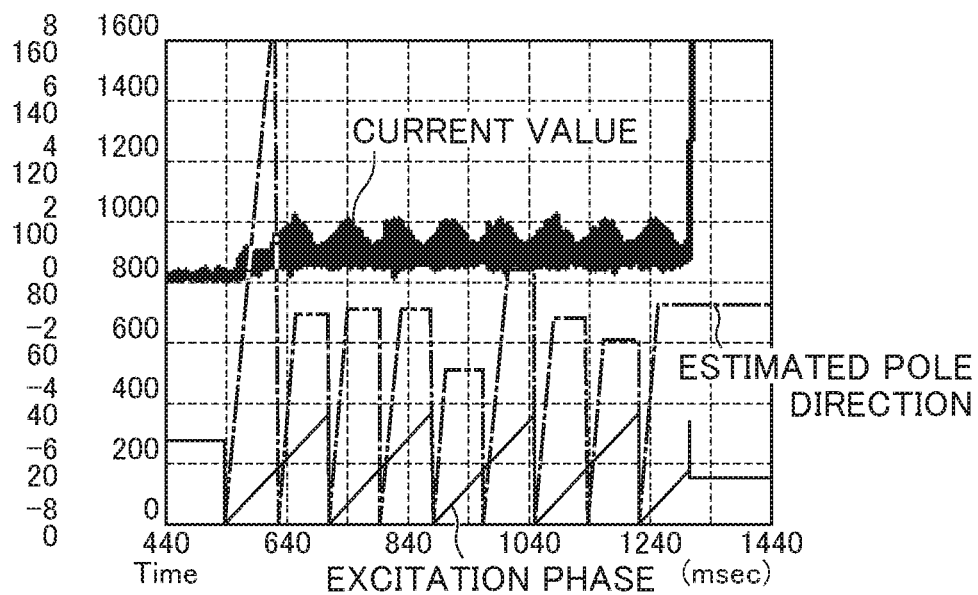
FIG. 5A is a graph showing an estimated pole direction when a high-frequency voltage having a higher frequency is applied.
Figure 5B:
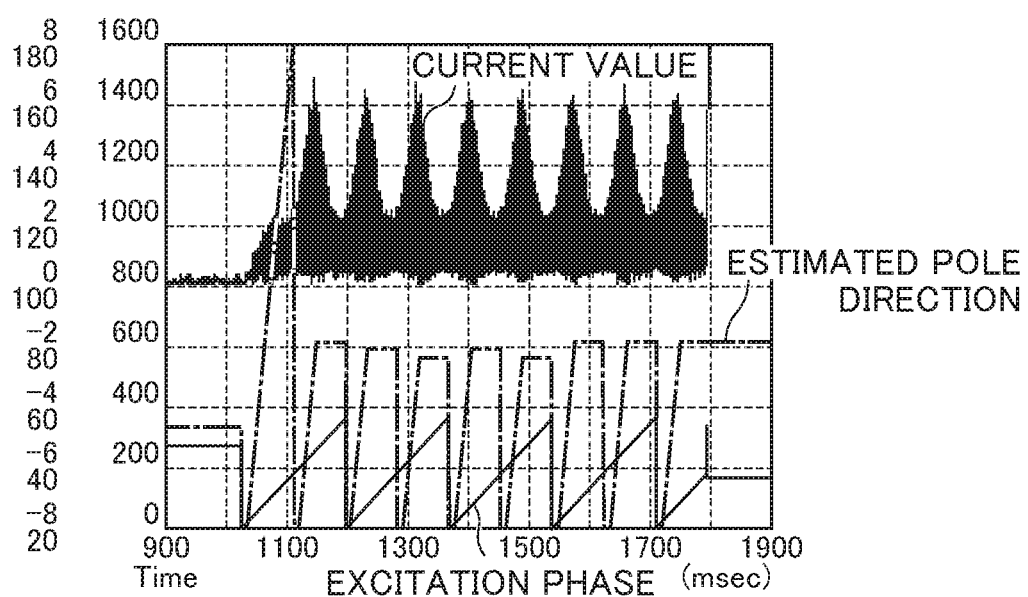
FIG. 5B is a graph showing an estimated pole direction when a high-frequency voltage having a lower frequency is applied.

FIGS. 5A and 5B each show an estimation result of the pole direction when a high-frequency voltage is applied, a frequency of the high-frequency voltage applied in FIG. 5A being different from that in FIG. 5B. FIG. 5B shows a result when the high-frequency voltage having a frequency lower than that in FIG. 5A is applied. The detected current value and the variation in the estimated pole direction in FIG. 5B are greater and smaller than those in FIG. 5A, respectively.

Figure 6A:
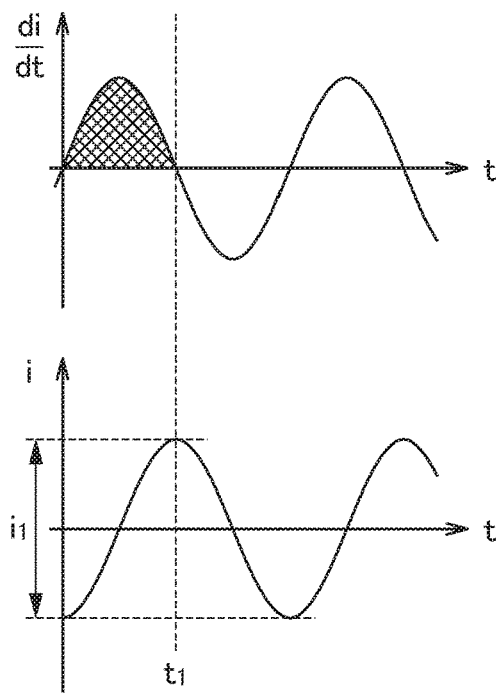
FIG. 6A is a graph showing a relationship between the current time integral value and a current value when the high-frequency voltage having a higher frequency is applied.
Figure 6B:
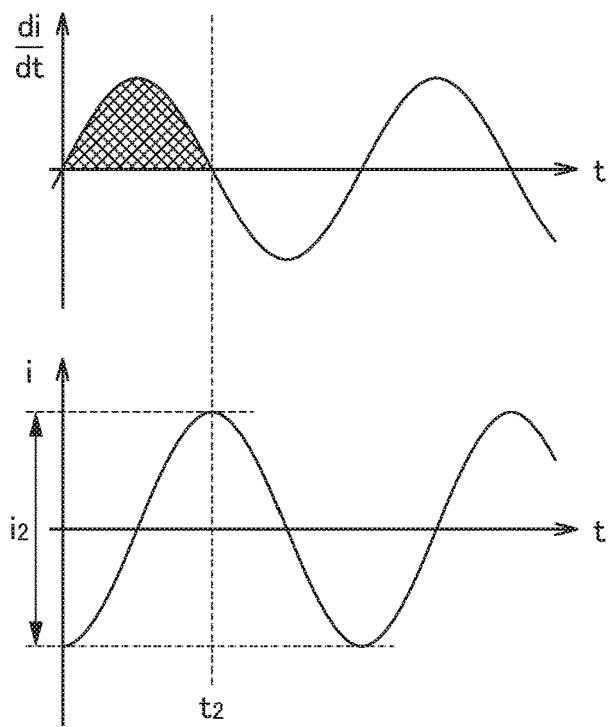
FIG. 6B is a graph showing a relationship between the current time integral value and the current value when the high-frequency voltage having a lower frequency is applied.

The current value increases when the frequency of the high-frequency voltage to be applied is changed to become lower, whereby the pole direction can be detected with higher accuracy. This will be described in detail. FIGS. 6A and 6B each are a graph showing changes over time of the current time integral value and the current value by being arranged vertically. FIG. 6B shows a result when the high-frequency voltage having a frequency lower than that in FIG. 6A is applied. Each of "$t_1$" and "$t_2$" represents a half-cycle time t, and each of "$i_1$" and "$i_2$" represents amplitude of the current i, where $t_1<t_2$ and $i_1<i_2$ are established.

According to the following equation (1), the amplitude of the current time integral value depends on only θ and the inductance, and hence the amplitude of the current time integral value is constant even when the frequency of the high-frequency voltage is lowered. On the other hand, a wavelength increases when the frequency is lowered, whereby "$t_2$" is longer than "$t_1$." As a result, when the frequency of the voltage to be applied is lowered, an area of a shaded portion in the graph of the current time integral value increases. When a graph of the current value is integrated with respect to time, a graph of the current time integral value is obtained. Therefore, an area of the shaded portion in the graph of the current time integral value represents the magnitude of the amplitude of the corresponding current value graph. Accordingly, the current value increases when the frequency of the high-frequency voltage to be applied is changed to become lower.

However, when the current value becomes too large, the heat generation from the motor 10 increases. Therefore, it is preferable to change the frequency of the voltage to be applied so that a current to be applied to the motor 10 is within an appropriate current value range. Furthermore, when the motor 10 includes a limiter so that an upper limit value is set for the current flowing in the motor 10 to prevent overcurrent, the pole direction detection device 1 cannot measure the change over time of the current value accurately when the current value becomes too large, which makes it impossible to detect the local maximum value and the local minimum value of the current time integral value with high accuracy. Accordingly, in this case, it is preferable to change the frequency of the voltage to be applied so that the current value is less than the set upper limit value.

In the case where the motor serving as a detection target is the embedded magnet type motor 10, it is preferable that the pole position can be further detected by the pole position detection unit 8. The conventionally known method can be used as a method of detecting the pole position, and the pole position can be detected by, for example, the following method. Firstly, an external magnetic field is applied to the motor 10 in a direction parallel to the pole direction detected by the pole direction detection device 1. Subsequently, a sign of the external magnetic field is reversed. When the direction of application of the external magnetic field is the same as a direction of a magnetic field formed by the permanent magnets 13, magnetic saturation occurs, and the inductance decreases further than when a magnetic field is applied in the opposite direction to the above-described direction, and the change in the current value increases. Using the property, the pole position can be detected.

Figure 7:
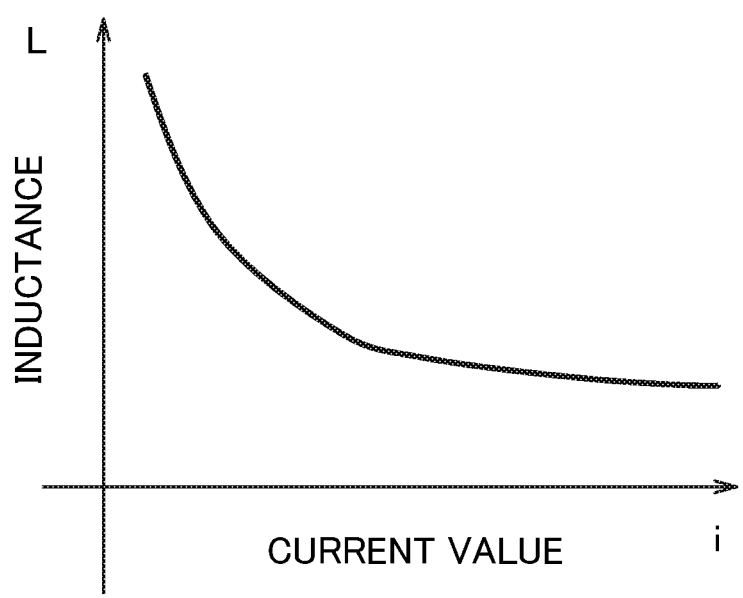
FIG. 7 is a graph showing current value dependence of an inductance.

As further shown in FIG. 7, the inductance value depends on the current value, and hence the inductance value decreases when the current value increases. That is, in the excitation phases when the amplitude of the current time integral value increases, the current value increases and the inductance decreases. Therefore, the amplitude of the current time integral value further increases. As a result, the amplitude of the current time integral value changes around the local maximum value more rapidly than around the local minimum value, and hence the estimation of the pole direction is less likely to be affected by the noise, whereby the pole direction can be detected with high accuracy.

The measurement unit 6 measures an inductance value of the motor 10 to which the high-frequency voltage is applied, while changing the excitation phase. The measurement method is not limited to a particular method. For example, the conventionally known method of calculating the inductance value based on the measured voltage and current value can be used. It is only required that the inductance value can be measured at an order level.

The control unit 7 changes the frequency of the high-frequency voltage to be applied by the high-frequency voltage application unit 2, based on the inductance value measured by the measurement unit 6. An inductance threshold is determined in advance. When the inductance is greater than the threshold, the current value is small, resulting in that the detection of the current value is likely to be affected by the noise. Therefore, the frequency of the voltage to be applied is changed to become lower. This enables the current value to increase, thereby improving the detection accuracy of the current value.

Figure 8:
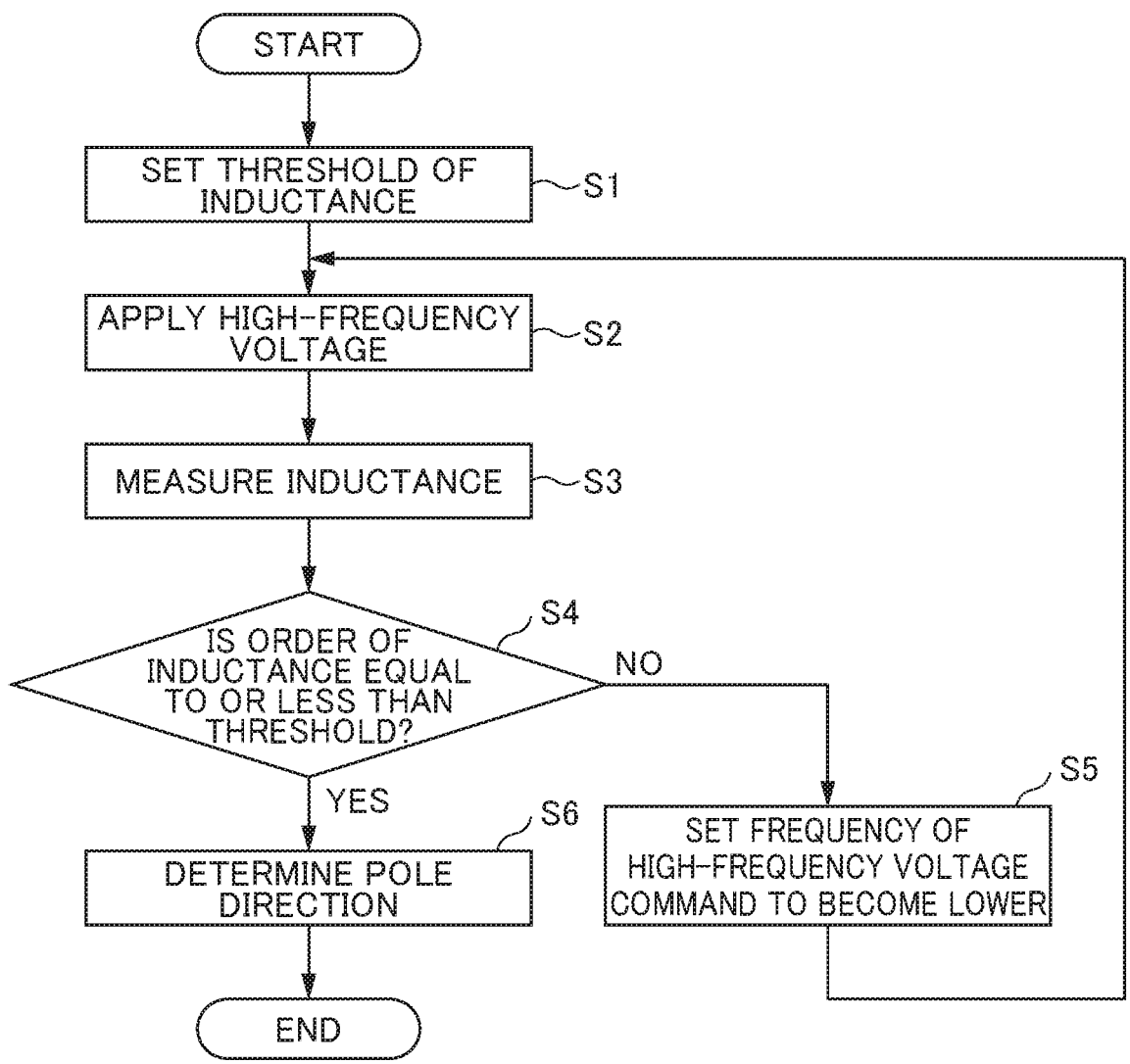
FIG. 8 is a flowchart illustrating a pole direction detection method according to one embodiment of the present invention.

Hereinafter, an example of the pole direction detection according to the present embodiment will be described using a flowchart in FIG. 8.

Firstly, a threshold of an inductance is set according to intended accuracy (Step S1). Next, in a high-frequency voltage application step, the high-frequency voltage application unit 2 applies a high-frequency voltage having a frequency A to the rotor 11 of the motor 10 (Step S2). Next, in an excitation phase change step, an excitation phase θ of the motor 10 is changed over S cycles by the excitation phase change unit 3, and in a driving current detection step, a driving current flowing in the motor 10 is detected by the driving current detection unit 4. Next, in a pole direction estimation step, the pole direction estimation unit 5 estimates a pole direction of the motor 10 based on the driving currents detected 2S times by the driving current detection unit 4 and the respective excitation phases θ. Next, in a measurement step, the measurement unit 6 measures an inductance value of the motor 10 in the applied voltage having the frequency A (Step S3).

Subsequently, the control unit 7 compares the inductance value measured for the applied voltage having the frequency A with the threshold set in Step S1 (Step S4). When the inductance value is equal to or less than the predetermined threshold, the control unit 7 outputs an estimation result of a pole direction according to the inductance value as a detection result of a pole direction of the motor 10 (Step S6). When the inductance value is greater than the predetermined threshold, the control unit 7 changes the frequency of the high-frequency voltage to be applied in the high-frequency voltage application step to a frequency B lower than the frequency A, and the processes of Steps S2 to S4 are retried (Step S5).

These processes are repeated while lowering the frequency of the voltage to be applied until the inductance value becomes equal to or less than the predetermined threshold. When obtaining the inductance value equal to or less than the predetermined threshold, the control unit 7 outputs an estimation result of a pole direction according to the inductance value as a detection result of a pole direction of the motor 10 (Step S6).

As described above, the detection result of the pole direction can be obtained with small variation and high accuracy. Note that in the case where the motor serving as a detection target is the embedded magnet type motor 10, the pole position detection unit 8 may further detect the pole position by applying an external magnetic field to the motor 10 in both directions parallel to the pole direction after Step S6.

The pole direction detection device 1, which is one embodiment of the present invention, has been described above. According to the present invention, the following effects can be obtained.

(1) One embodiment of the present invention provides a pole direction detection device 1 for detecting a pole direction of a synchronous motor 10 having saliency, the pole direction detection device 1 comprising: a high-frequency voltage application unit 2 that applies a high-frequency voltage to the motor 10; an excitation phase change unit 3 that changes an excitation phase of the motor 10 to an arbitrary phase; a driving current detection unit 4 that detects a driving current value of the motor 10; a pole direction estimation unit 5 that executes pole direction estimation based on the excitation phase and the driving current value under application of the high-frequency voltage; a measurement unit 6 that measures an inductance value of the motor 10; and a control unit 7 that changes a frequency of the high-frequency voltage to be applied by the high-frequency voltage application unit 2 based on the inductance value measured by the measurement unit 6. This makes it possible to detect the pole direction with high accuracy.

(2) The pole direction detection device 1 further comprises a pole position detection unit 8 that can apply an external magnetic field to the motor 10 in both directions parallel to the detected pole direction. This makes it possible to detect a pole position with high accuracy.

(3) The excitation phase change unit 3 of the pole direction detection device 1 rotates the motor 10 "S" cycles (S is an integer equal to or greater than 1). This improves the accuracy of variation calculation, which makes it possible to detect the pole direction with higher accuracy.

(4) The pole direction estimation unit 5 of the pole direction detection device 1 detects the excitation phase when a driving current time integral value becomes a local maximum, and estimates, as the pole direction, the detected excitation phase when $Ld<Lq$ is established and a phase shifted by 90° from the detected excitation phase when $Lq<Ld$ is established. This improves the accuracy of current value detection, which makes it possible to detect the pole direction with higher accuracy.

(5) One embodiment of the present invention provides a pole direction detection method of detecting a pole direction of a synchronous motor 10 having saliency, the pole direction detection method comprising: a high-frequency voltage application step of applying a high-frequency voltage to the motor 10; an excitation phase change step of changing an excitation phase of the motor 10 to an arbitrary phase; a driving current detection step of detecting a driving current value of the motor 10; a pole direction estimation step of executing pole direction estimation based on the excitation phase and the driving current value under application of the high-frequency voltage; a measurement step of measuring an inductance value of the motor 10; and a voltage-to-be-applied frequency change step of changing a frequency of the high-frequency voltage to be applied in the high-frequency voltage application step based on the inductance value measured in the measurement step. This makes it to possible to detect the pole direction with high accuracy.

EXPLANATION OF REFERENCE NUMERALS

1 Pole direction detection device
2 High-frequency voltage application unit
3 Excitation phase change unit
4 Driving current detection unit
5 Pole direction estimation unit
6 Measurement unit
7 Control unit
8 Pole position detection unit
10, 20 Motor
11, 21 Rotor
12, 22 Iron core
13 Permanent magnet

What is claimed is:

1. A pole direction detection device for detecting a pole direction of a synchronous motor having saliency, the pole direction detection device comprising a processor, the processor being configured to:
apply a high-frequency voltage to the motor;
change an excitation phase of the motor to an arbitrary phase;
detect a driving current value of the motor;
execute pole direction estimation based on the excitation phase and the driving current value under application of the high-frequency voltage;
measure an inductance value of the motor based on the detected driving current value; and
change a frequency of the high-frequency voltage to be applied based on the measured inductance value.

2. The pole direction detection device according to claim 1, wherein the processor is capable of applying an external magnetic field to the motor in both directions parallel to the detected pole direction.

3. The pole direction detection device according to claim 1, wherein the processor changes the excitation phase over 360° or more.

4. The pole direction detection device according to claim 1, wherein the processor detects the excitation phase when a time integral value of the driving current value becomes a local maximum, and estimates, as the pole direction, a phase shifted by 90° from the detected excitation phase.

5. A pole direction detection method of detecting a pole direction of a synchronous motor having saliency, the pole direction detection method performed by a processor, comprising:
- a high-frequency voltage application step of applying a high-frequency voltage to the motor;
- an excitation phase change step of changing an excitation phase of the motor to an arbitrary phase;
- a driving current detection step of detecting a driving current value of the motor;
- a pole direction estimation step of executing pole direction estimation based on the excitation phase and the driving current value under application of the high-frequency voltage;
- a measurement step of measuring an inductance value of the motor based on the detected driving current value; and
- a voltage-to-be-applied frequency change step of changing a frequency of the high-frequency voltage to be applied based on the inductance value measured in the measurement step.

\* \* \* \* \*